Feb. 3. 1925.
W. H. HERBERT
GRAVEL WASHER AND SEPARATOR
Filed May 2, 1923
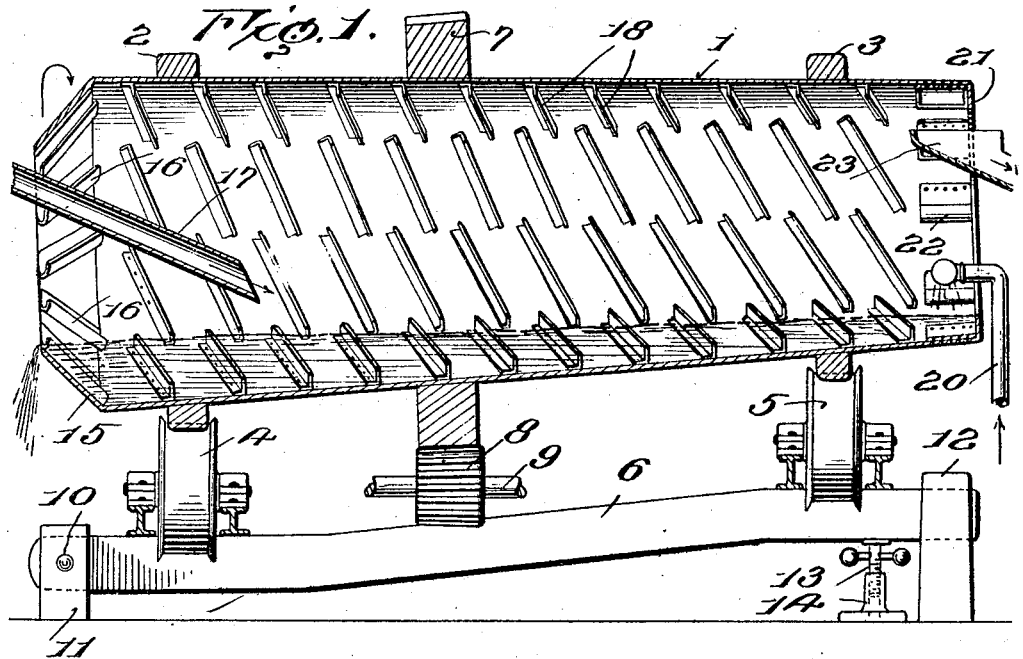
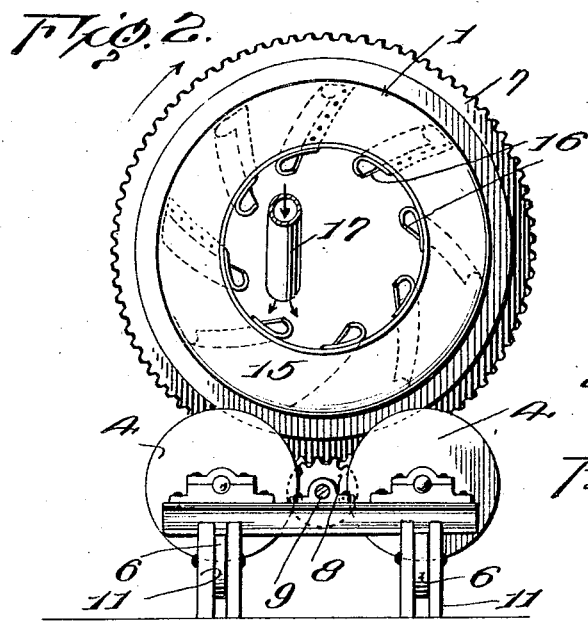
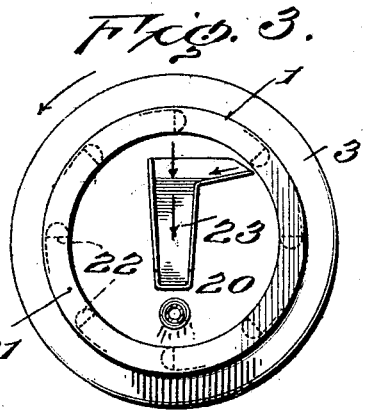
Inventor
W. H. Herbert
By C. R. Wright, Jr.
Attorney Patented Feb. 3, 1925.

1,525,300

UNITED STATES PATENT OFFICE.

WILLIAM H. HERBERT, OF NASHVILLE, TENNESSEE.

GRAVEL WASHER AND SEPARATOR.

Application filed May 2, 1923. Serial No. 636,089.

*To all whom it may concern:*

Be it known that I, WILLIAM H. HERBERT, of Nashville, in the county of Davidson, State of Tennessee, have invented certain new and useful Improvements in Gravel Washers and Separators; and I do hereby declare the following to be a full, clear, and exact description of the invention, such as will enable others skilled in the art to which it appertains to make and use the same.

My invention relates to improvements in gravel washers and separators.

The object of my invention is to provide a separator of this character in which the gravel from the gravel beds is discharged into the lower end of an inclined tapering rotating drum arranged in an inclined position and the gravel caused to travel upwardly and discharge from the upper end. The water supply is provided for the upper end of the cylinder whereby the lighter material in the gravel is caused to travel downwardly by the current of water in the drum, and also by flotation and to be discharged from the lower end.

Another object of my invention is to provide a separator of this character in which the gravel of different size or specific gravity may be readily washed and separated from the lighter materials.

A further object of my invention is to provide a simple, cheap and effective separator and washer of this character having certain details of structure and combination of parts hereinafter more fully set forth.

In the accompanying drawings:

Figure 1 is a longitudinal, vertical sectional view of my improved washer and separator.

Figure 2 is an end view looking from the lower end.

Figure 3 is an end view looking from the upper end.

Figure 4 is a perspective view of one of the lifting buckets carried by the upper end.

Figure 5 is a perspective view of one of the flights.

In washing and separating gravel, it has become very essential that all of the clay and other foreign matter be thoroughly washed from the gravel, and that all rubbish be separated therefrom so that when it is used in cement construction work the cement and sand will closely adhere to the gravel and thus form a more durable and stronger concrete construction.

Referring now to the drawings, 1 represents my improved rotating drum which, as shown, tapers from the lower end and is arranged in a slightly inclined position. The outer periphery of the drum adjacent its lower end is provided with an annular flange 2 adjacent the opposite end of the annular flange 3 which rests upon two sets of rollers 4 and 5 mounted upon the base 6 whereby the cylinder is free to rotate and yet supported against longitudinal movement. The outer periphery of the drum intermediate the flanges 2 and 3 is provided with a gear flange 7 meshing with a pinion 8 mounted upon the shaft 9. This shaft 9 may be driven by any desired means and the rotation of the shaft will cause the rotation of the drum 1 to cause the proper washing and separation of the gravel as will be later described.

The base 6 is preferably pivotally mounted at 10 in standards 11 and the opposite end vertically movable in standards 12 to prevent any lateral movement thereof. The base 6 adjacent the standards 12 is supported by a screw 13 working in the base 14 and whereby the base 6 may be raised and lowered for changing the inclination of the rotating drum 1. While I have shown this specific manner of adjusting the drum at the different angles, it will be understood that this could be varied without departing from my invention.

The drum 1, as heretofore stated, tapers towards the upper end, as this has been found very essential in the proper washing and separation of gravel. The lower end of the drum 1 is provided with an inwardly drawn annular flange 15 which partially closes the lower end of the drum and maintains a water level therein. This portion 15 is provided with lifting blades 16 which are adapted to raise the heavier rubbish and the like and discharge it from the drum. The lighter rubbish and the like will be carried from the drum by flotation or the flow of the water therefrom. Extending into the lower end of the drum 1 is the supply pipe or chute 17 which, as shown in Figure 1 of the drawings, extends a considerable distance into the drum, and whereby the gravel is fed to the drum.

The interior wall of the drum 1 is provided with a series of flights 18 arranged in rows and the ends of each row slightly overlapping the ends of the adjacent rows so as to form a worm to cause the gravel to travel upwardly towards the discharge or upper end of the drum. These flights, as shown, are arranged at approximately right angles to the lifting blades 16 and gradually increase in pitch towards the upper end of the drum. This gradual increase of the pitch of the flights 18 increases the speed of the gravel as it travels towards the discharge end so that the flow of the water into the upper end will not carry the gravel towards the rear or lower end of the drum. The water supply pipe 20, as shown, discharges into the drum at the upper end close to the bottom and the flow of water through the same is varied according to the size of the gravel being washed and separated. The extreme upper end of the rotating drum 1 is provided with an inwardly extending annular flange 21 which maintains a water level in the lower end of the rotating drum, as clearly shown in Figure 1 of the drawings.

The inner periphery of the rotating drum 1 adjacent the flange 21 is provided with a series of lifting buckets 22 which are adapted to receive the washed gravel as it reaches the upper end of the drum and carried around and discharged into the chute 23 and is discharged from the chute on the outside of the rotating drum.

It has been found in practice that where larger gravel or material of greater specific gravity is used or being washed and separated that it is necessary to increase the inclination of the rotating drum in order that material of nearly the same specific gravity will be carried down towards the discharge or lower end of the drum. At the same time, it is also necessary to increase the flow and volume of water being fed into the upper end of the rotating drum. The inclination of the lifting flights 18 being increased towards the upper end of the rotating drum causes the gravel to travel faster and thus be affected less by the downward flow of water through the drum and yet allow of the lighter material being carried towards the lower end of the drum.

Having thus fully described my invention, what I claim is:

1. A gravel washer and separator comprising a rotating drum gradually tapering towards the upper end and arranged in an inclined position and constructed to maintain a water level therein, the inner periphery of the rotating drum having flights the pitch of which gradually increases towards the upper end, a supply chute for the lower end of the rotating drum, a water supply for the upper end of the drum, and a chute extending into the upper end of the drum and receiving the washed gravel and discharging it therefrom.

2. A gravel washer and separator comprising a tapering drum arranged in an inclined position, means for adjusting the inclination of said drum, means for maintaining a water level in the drum, lifting blades carried by the lower end of the drum for discharging the lighter materials from the drum, flights carried by the inner periphery of the drum and gradually increasing in pitch towards the upper end, a water supply for the upper end of the drum, a chute extending into the upper end of the drum, and lifting buckets carried by the inner periphery of the drum and adapted to receive the gravel from the lifting buckets.

3. A gravel washer and separator comprising a tapering drum horizontally mounted and having its lower end drawn inwardly at an angle, lifting blades carried by the inwardly drawn end of the drum, flights carried by the inner periphery of the drum and the angle of said flights increasing towards the other end to cause a more rapid movement of the gravel therethrough, a water supply for the upper end of the drum, means for supplying gravel to the lower end of the drum, and means for discharging the washed gravel from the upper end of the drum.

4. A gravel washer and separator comprising a tapering drum arranged in an inclined position, means for maintaining a water level in the drum, a water supply for the upper end of the drum, the inner periphery of the drum having flights arranged in rows and having their ends overlapping each other and the pitch of said flights increased towards the upper end of the drum to cause a more rapid movement of the gravel in its travel through the drum.

5. A gravel washer and separator comprising a tapering drum mounted to rotate in an inclined position and having its lower end drawn inwardly at an angle, lifting blades carried by the inclined lower end, a water supply for the upper end of the drum, the inner periphery of the drum having flights gradually increasing in pitch towards the upper end, and means for discharging the gravel from the upper end of the drum.

6. A gravel washer and separator comprising an inclined tapering rotating drum, a maintained water level in the drum, means for supplying gravel to the lower end of the drum, a water supply for the upper end of the drum, flights arranged on the inner periphery of the drum and gradually increasing in pitch towards the upper end of the drum to increase the speed of travel of the gravel through the drum, and buckets carried by the upper end of the drum for discharging the washed gravel therefrom.

7. A gravel washer and separator comprising a rotating inclined tapering drum having its lower end drawn inwardly to maintain a water level therein, lifting blades carried by the inwardly drawn lower end for discharging the lighter materials from the drum, a gravel supply extending some distance into the lower end of the drum, flights carried by the inner periphery of the drum and gradually increased in pitch towards the upper end, a water supply for the upper end of the drum, a chute extending into the upper end of the drum, and buckets carried by the inner periphery of the upper end of the drum for discharging the washed gravel into the discharge chute.

8. A gravel washer and separator comprising a tapering inclined rotating drum having its lower end drawn inwardly, lifting blades carried by the inwardly drawn lower end for discharging the lighter material therefrom, a gravel supply chute extending considerable distance into the drum, flights carried by the inner periphery of the drum and arranged in longitudinal rows having their ends overlapping in staggered relation, to the pitch of the flights gradually increasing towards the upper end, a water supply for the upper end of the drum, a discharge chute extending into the upper end of the drum, and lifting buckets carried by the inner periphery of the drum and discharging the washed gravel into the discharge chute.

In testimony whereof, I have signed this specification.

WILLIAM H. HERBERT.